United States Patent [19]

Davis

[11] Patent Number: 5,835,053
[45] Date of Patent: Nov. 10, 1998

[54] ROADWAY GROUND PENETRATING RADAR SYSTEM

[75] Inventor: John Leslie Davis, Mississauga, Canada

[73] Assignee: Road Radar Ltd., Alberta, Canada

[21] Appl. No.: 82,115

[22] Filed: Jun. 28, 1993

[51] Int. Cl.$^6$ .............................. G01S 13/04; G01V 3/12
[52] U.S. Cl. ................................................. 342/22
[58] Field of Search .................................. 342/22

[56] References Cited

U.S. PATENT DOCUMENTS

| | | | |
|---|---|---|---|
| 2,575,340 | 11/1951 | Goldstein | 342/22 X |
| 3,392,384 | 7/1968 | Wesch | 342/22 |
| 3,400,363 | 9/1968 | Silverman | 342/179 X |
| 3,665,466 | 5/1972 | Hibbard | 342/59 |
| 4,161,731 | 7/1979 | Barr | 342/22 |
| 4,212,258 | 7/1980 | Collins | 367/8 X |
| 4,481,517 | 11/1984 | Brown | 342/22 |
| 4,504,833 | 3/1985 | Fowler et al. | 342/22 |
| 4,698,634 | 10/1987 | Alongi et al. | 342/22 |
| 4,899,296 | 2/1990 | Khattak | 364/550 |
| 4,905,008 | 2/1990 | Kawano et al. | 342/22 |
| 4,951,055 | 8/1990 | Katayama | 342/22 |
| 4,967,199 | 10/1990 | Gunton et al. | 342/22 |
| 5,012,248 | 4/1991 | Munro et al. | 342/22 |
| 5,124,709 | 6/1992 | Baron et al. | 342/192 |
| 5,130,711 | 7/1992 | Kimura et al. | 342/22 |
| 5,192,953 | 3/1993 | Tomita | 342/22 |
| 5,248,975 | 9/1993 | Schutz | 342/21 |
| 5,287,740 | 2/1994 | Tomita | 73/146 |
| 5,327,139 | 7/1994 | Johnson | 342/22 |
| 5,357,253 | 10/1994 | Van Etten et al. | 342/22 |

FOREIGN PATENT DOCUMENTS

| | | |
|---|---|---|
| 1244919 | 11/1988 | Canada . |
| 1280193 | 2/1991 | Canada . |

*Primary Examiner*—John B. Sotomayor
*Attorney, Agent, or Firm*—Millen, White, Zelano & Branigan, P.C.

[57] ABSTRACT

A roadway ground penetrating radar system is provided for generating a continuous profile of the pavement structure. The profile shows individual layer and sub-surface anomaly depth and thickness. Radar signals are transmitted into the structure using a surface-coupled transmitter antenna and reflected waves are received by an array of surface-coupled receiver antennas located at different known spacings from the transmitter antenna. The different signal travel times are measured. An accurate measure (±5%) of signal velocity through each pavement layer can be calculated using the surface-coupled assembly spacing and travel time information. With the velocity accurately known at each sounding point, using conventional calculations one can determine interface depth and layer thickness, to an accuracy in the order of ±5%. In a preferred embodiment, an air-launched "horn" antenna assembly is used in conjunction with the surface-coupled antenna assembly. The horn antenna assembly gives good resolution for layer thicknesses of about 50–100 mm; the surface-coupled antenna assembly gives good resolution for layer thicknesses greater than about 100–150 mm, and gives greater penetration depth. The system can be wheel mounted for advancing continuously along the roadway and the radar data can be synchronized with roadway location.

4 Claims, 7 Drawing Sheets

ROADWAY GROUND PENETRATING RADAR SYSTEM

FIELD OF THE INVENTION

The present invention relates to ground penetrating radar systems for use in surveying pavement structure and producing a profile of sub-surface layer depth and thickness.

BACKGROUND OF THE INVENTION

Ground Penetrating Radar ("GPR") systems are used to make measurements of different structures in the ground. These systems are also referred to as impulse radar systems. Each system incorporates a transmitter having an antenna that radiates or emir a short pulse of radio frequency, typically in the frequency range from 1 MHz to 10 GHz, into the sub-surface medium. GPR systems (compared to other radar systems) are characterized by being able to generate a pulse length which is short with respect to the wavelength of the centre frequency being transmitted. In practice, a pulse of 1.0 to 2.0 cycles of the centre frequency can be emitted.

Wherever there is a change in the electrical properties in the ground, part of the pulse is reflected and part of the pulse propagates into the next layer. Stated otherwise, waves or pulses are reflected by reflective interfaces defining upper and lower margins of a sub-surface layer or anomaly. The reflected pulses are detected at the antenna of a receiver. The travel time (t) elapsed from emission to detection is measured accurately. If the velocity (v) in a layer is known, then its thickness (d) can be determined using the relationship:

$$i \; db = \tfrac{1}{2}(tv). \qquad (1)$$

There are basically two types of GPR antenna systems in use for surveying roadways. The most common antenna type is a transverse electromagnetic transmission line antenna or "horn" which transmits and detects radio wave energy, typically operating at centre frequencies of 0.5 to 5 GHz. The horn antenna is elevated from the road surface to be most effective.

The second antenna type is a resistively loaded dipole system which typically operates at centre frequencies of 2 GHz or less. The dipole antenna is usually put on or very near the ground surface and is now being moved from general geotechnical applications to road surveys. For this application the transmitting and receiving antennas are in contact or almost in contact with the road surface.

The resolution of detection of sub-surface layers or anomalies is a function of the pulse length, and hence of the radio frequency (or wavelength) of the radar signal. Shorter pulse lengths provide better resolution, and it is easier to achieve shorter pulse lengths with a higher centre frequency system. Therefore, the horn antenna systems, which tend to operate at higher frequency, enable thinner layers to be resolved.

The depth of penetration through most materials is a function of the operating frequency (or wavelength). Typically, lower frequencies are able to penetrate with less attenuation. Also, better penetration into the ground is achieved when the antennas are coupled closely to the ground surface. Therefore, the surface-coupled antenna systems permit detection of features at deeper depths.

A horn antenna system operating at a centre frequency of about 3 GHz can resolve layers as thin as 50 mm and can detect features to depths of 300 to 500 mm in typical materials. A surface-coupled antenna system operating at a centre frequency of about 1 GHz can resolve layers as thin as 100 to 150 mm and can typically detect features to depths of 1 to 2 m.

The basis of all radar detection systems is that the time between the transmission of a radio wave pulse and the receipt of its reflection can be measured very accurately. If the velocity of the radio pulse through the material being examined is known, then the distance to the reflecting feature can be simply calculated using equation 1.

A complication which arises is that the material properties vary widely between differing materials of construction and can even vary within a single material which has all the appearances of being uniform. Material properties such as density, material mix, and particularly moisture content, affect the velocity of radio waves therein. In the materials of construction common to road building practices, the property which is used to describe the velocity of radio waves in materials, is called the dielectric constant, K, through the relation:

$$K = \left(\frac{c}{V}\right)^2$$

where c is the speed of light in free space. The velocity of radio waves through various naturally occurring materials varies from as high as $3 \times 10^8$ m/s (the speed of light in free space) to as low as $0.33 \times 10^8$ m/s in water.

Experience has shown that in typical roadway structures, involving materials such as asphalt and concrete, the variaiton of the radio signal velocity in seemingly identical, adjacent material can vary by as much as 50%. If the velocity term is in error by 50% then the distance calculation will also be in error by 50% when using equation 1.

Commercially acceptable accuracies in measuring the depth of roadway sub-surface features is ±5%; this is clearly not achievable unless the actual in-situ velocity is accurately measured simultaneously with the signal travel time.

One prior art method used to determine the actual velocity of radio waves in the material of immediate study is to physically extract a core at a radar sounding point and to calibrate the radar-based calculated depth with the actual measured depth of a reflective feature in the core. However, this is an expensive and inconvenient option, particularly if kilometres of road are to be surveyed, and is destructive of the roadway. Clearly, the calibration is only valid at the point where the core is extracted.

Another prior art method for determining material velocity is to measure the amplitude of the reflected wave using air-launched antennas. The amplitude, which is a function of the relative dielectric constants of each material, is a measure of the reflection coefficient, P at the interface.

$$P = \frac{\sqrt{K_2} - \sqrt{K_1}}{\sqrt{K_2} + \sqrt{K_1}} \qquad (2)$$

This approach to estimation of K is valid only if the following conditions are true:

that the radar instrument can measure the amplitude with sufficient accuracy;

that the layer thickness is large with respect to the signal pulse length;

that the surface of the material is smooth compared to the signal wavelength;

that there is no attenuation of the radar signal in the material; and that the surface is dry.

In practice, using an air-launched instrument for investigation of road layers, the previous conditions are invalid as follows:

generally, instrument amplitude fidelity is less than ±10%;

the signal pulse length in asphalt and concrete is typically greater than 100 to 150 mm and the layer thickness of interest is similarly sized at about 50 to 150 mm;

a surface roughness of 10 mm at the reflecting surface will degrade the amplitude of the reflected wave by about 20%;

the attenuation of road materials can be significant (in the order of 10 dB/m); and road surfaces are often wet with moisture or other contaminants.

With this background in mind, it is an objective of the present invention to develop a continuous, accurate system for measuring variable radio signal velocity in materials and to thereby achieve better measures of the depths of each of the sub-surface reflecting features.

SUMMARY OF THE INVENTION

In accordance with the invention, a specifically modified ground penetrating radar ("GPR") system is provided for continuously and accurately determining a measure of the depth of subterranean reflecting features or interfaces in the course of simultaneously advancing the GPR assembly along a roadway surface.

In one feature of the invention, the problem of signal velocity error has been addressed by using at least two receivers having surface-coupled antennas positioned at different separations relative to the surface-coupled antenna of a transmitter. By knowing the-distinct spacings of the receivers from the transmitter and measuring the signal travel times, one acquires sufficient information to be able to calculate an accurate value for signal velocity through a layer of interest at that locality. Once an accurate measure of the signal velocity is known for a layer at a particular locality, one can then calculate accurately the depth and thickness of the layer at that locality.

By continuously emitting GPR signals and recording the times elapsed for reflected energy to reach the separated receivers and then making the required calculations using means such as a computer, we have developed an "over the road" system that can travel along a roadway and provide a nearly continuous profile of pavement structure layer depths and thicknesses, as well as a profile of the radar signal velocity in each layer.

In a preferred aspect, an air-launched transmitter and receiver ("horn antenna system") are combined with the previously described multiple-receiver, variably-spaced, surface-coupled antenna system, to provide a hybrid assembly. As previously stated, the horn antenna system provides high resolution in locating subterranean features at shallow depth; the surface-coupled antenna system provides good location of subterranean features at greater depth. The hybrid system has proven effective at locating the full range of layer interfaces to be monitored beneath roadway surfaces, from 50 mm down to a depth of about 2 m.

In one broad apparatus aspect then, the invention is a ground penetrating radar system for determining the depth and thickness of pavement structure layers, having top and bottom interfaces, comprising:

a transmitter having a surface-coupled antenna, for repeatedly radiating impulse radar signals, and at least two receivers having surface-coupled antennas spaced at different distances from the transmitter antenna for detecting the signals emitted from the transmitter antenna and reflected by each subterranean interface;

means for determining a measure of the signal travel time elapsed from the time each impulse is emitted to the time it is detected at each receiver antenna;

means for utilizing the travel time information and receiver antenna spacing to calculate a measure of signal velocity through a subterranean layer and to further calculate measures of the layer depth and thickness; and means for transporting the foregoing components along a roadway.

In operating the system, a novel method is practiced comprising:

transporting a ground penetrating radar transmitter having a surface-coupled antenna and at least two receivers having surface-coupled antennas spaced at different distances from the transmitter antenna along a roadway;

repeatedly radiating impulse radar signals from the moving transmitter antenna;

detecting the waves reflected by subterranean interfaces at each of the receiver antennas;

establishing the different elapsed signal travel times for each reflected wave detected by the at least two receivers;

utilizing the information obtained to calculate a measure of the signal velocity in a layer of material underlying the roadway; and utilizing the calculated signal velocity to calculate measures of the depth and thickness of the layer.

In another aspect, the surface-coupled array is used in an alternate manner to determine the velocity of radio waves in only the first layer. An impulse radio wave signal from the transmitter travels through the air to the receivers. The signal also travels through the material of the first layer and arrives at each receiver at a later elapsed time. Using the geometry of the transmitter and receiver spacing, the known velocity of radio signals in air, and the signal travel times through air and through the material, measures of the radio wave signal velocities in the first layer can be determined.

More particularly then, a method for determining the velocity of radio waves in the first layer comprises:

transmitting a signal through the air and through the material of the layer and measuring the travel times of the signals received at the receiver antennas; and utilizing spacing of the receiver antennas relative to the transmitter antenna and the signal travel times to determine a measure of the velocity of the signal in the layer.

DETAILED DESCRIPTION OF THE PREFERRED EMBODIMENT

Figure 1:
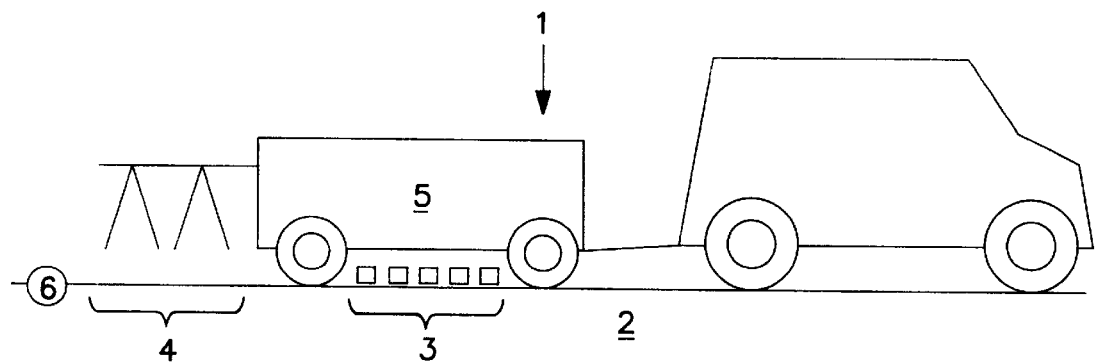
FIG. 1 is a schematic view of a ground penetrating radar system, mounted to a vehicle, positioned on a roadway.
Figure 8:
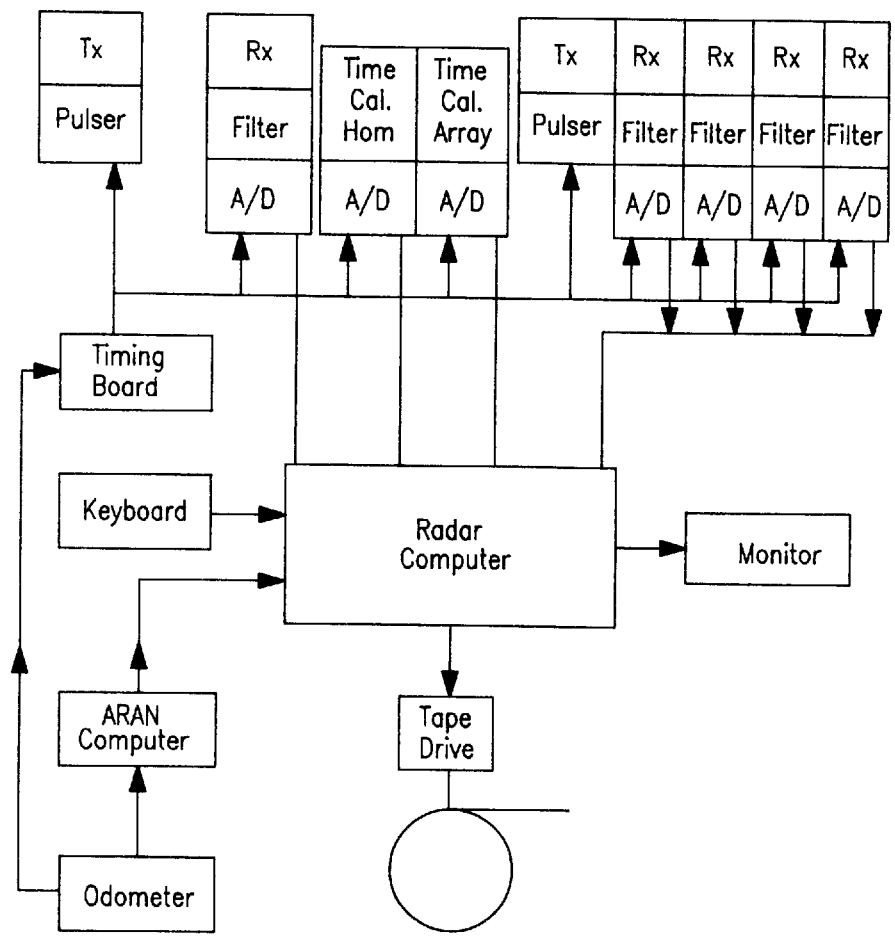
FIG. 8 is a schematic of the data collection system.

Referring to FIGS. 1 and 8, a ground penetrating radar (GPR) system 1 is provided as a non-destructive means for determining layer velocity, depth and thickness information relating to a roadway structure. (The term 'roadway' is to be broadly construed to denote roads, bridges and the like.)

The GPR system 1 comprises the combination of a surface-coupled assembly 3 and a horn antenna or air-launched assembly 4, mounted on a vehicle or trailer 5 for transportation over the surface 6 of the roadway 2.

Figure 2:
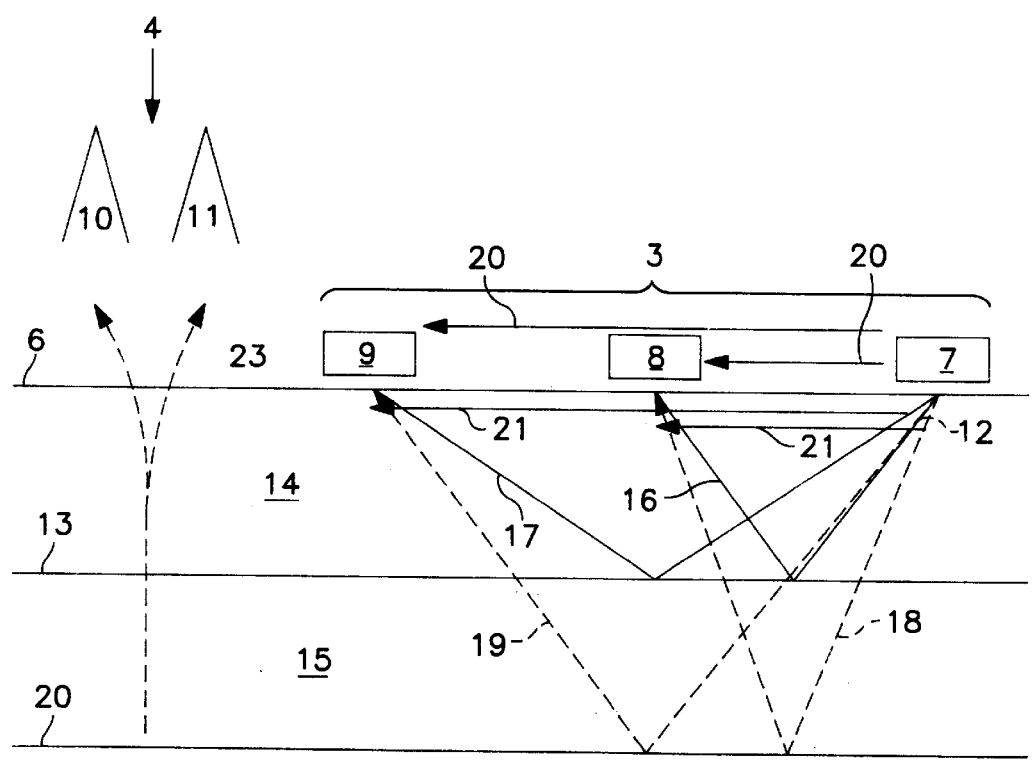
FIG. 2 is a schematic cross-sectional side view of both the surface-coupled and horn antenna systems according to FIG. 1, showing the radio wave signals as travelling through two layers and being reflected to the receiver antennas.

Referring to FIG. 2, the surface-coupled assembly 3 comprises a 1 GHz impulse radar transmitter having a dipole-type antenna 7 and at least two receivers having dipoletype antennas 8, 9. Each receiver antenna 8, 9 is spaced at a different distance from the transmitter antenna 7. Suitable surface-coupled receivers are available from Geophysical Survey Systems, Inc. (GSSI) of New Hampshire, U.S.A. and are identified by model number A31-024. The transmitter is supplied by Avetech of Ottawa, Ontario and identified by model number AVH-S-P-GSSI. The timing unit is a GSSI control unit, model SIR7.

Although the arrangement of the antennas 7, 8, 9 was as shown in FIG. 1, in line with the direction of sounding, other patterns may be used, as described below.

The air-launched assembly 4 comprises a 3 GHz impulse radar transmitter having a horn antenna 10 and a receiver having a horn antenna 11. Suitable components are: ERA Technologies (UK) 100 ps pulsar transmitter, Tektronix CSA 803 oscilloscope receiver, SD 22 sampling head, and Morey Research 3 GHz transverse electromagnetic transmission line antennas.

The system's transmitters emit short pulses 12 of radio wave energy which travel downward into the roadway structure 2. A portion of the pulse 12 reflects from any subterranean interface 13, 20 in the structure 2.

A first receiver antenna 8, closely spaced (e.g. 20–100 mm) from the transmitter antenna 7, detects the reflected radio wave 16. A second receiver antenna 9, located further from the transmitter antenna 7 than the first receiver antenna 8, detects a reflected wave 17.

The time which elapses between the transmission of the radio pulse and the time the reflected wave is detected is referred to as the signal travel time. The signal travel time is a function of the velocity of a radio wave through that particular material and the distance it travels. Assuming that the velocity of the material of the first layer 14 is uniform, the signal travel time of reflected wave 17 to the second receiver antenna 9 will be longer than signal travel time of the reflected wave 16 to the first receiver antenna 8. The signal travel time measured for each receiver 8, 9 is noted and processed with a data management system shown schematically in FIG. 9.

With the use of multiple receivers, significant quantities of data are generated at high speeds. For ease of use, and considering the precise positioning requirements of the road maintenance industry, the data management system has been developed to manage the information, formerly performed with a combination of data collection tools and manual interpretation of results. The system uses software that accepts the data from multiple receivers and automates its subsequent processing.

Figure 9:
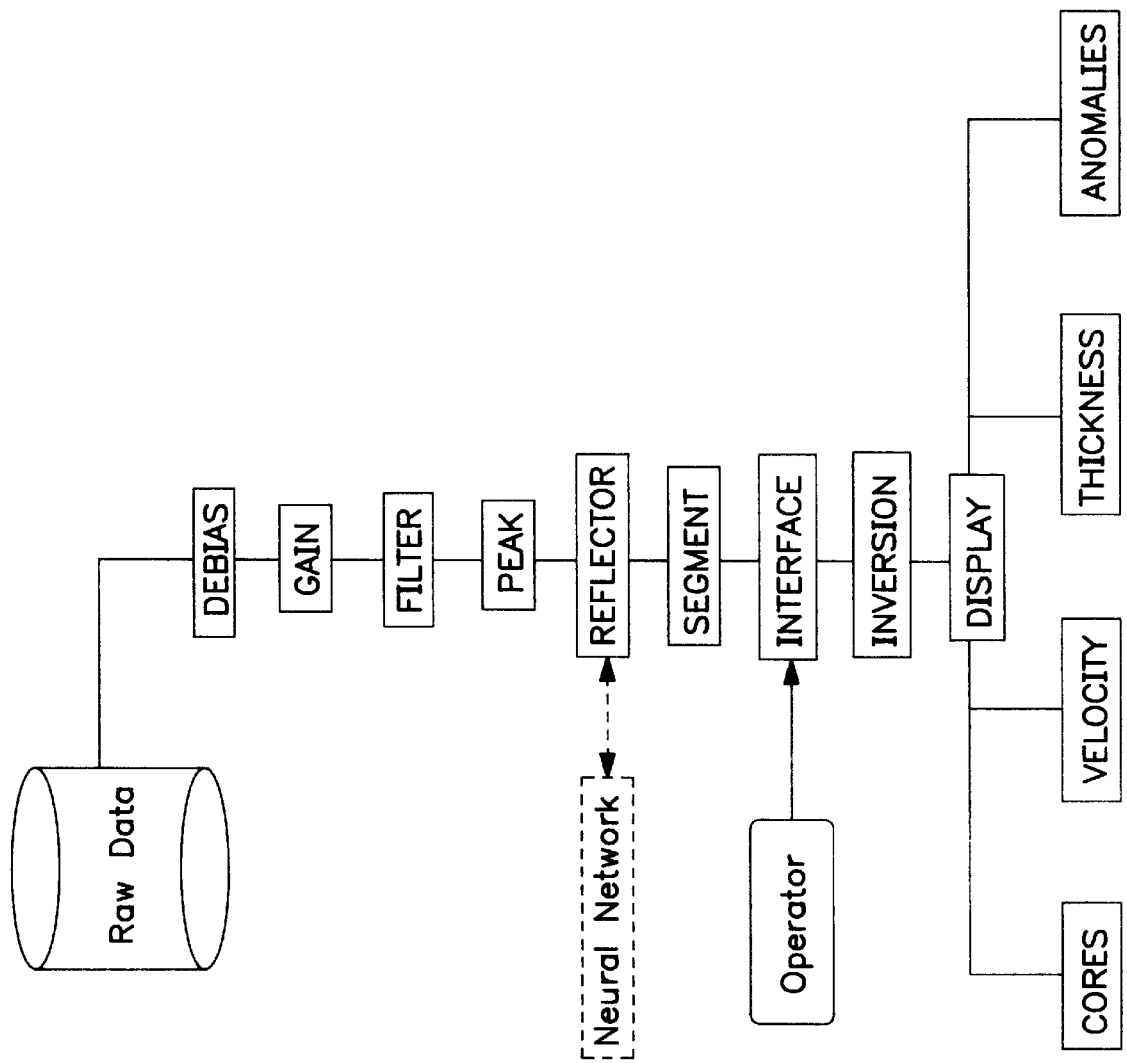
FIG. 9 is a program flowsheet for the software used by the data management system to process the results.

The software, as presented in a flowsheet in FIG. 9, includes routines adapted to filter noise, discard faulty data, compensate for known material refraction effects, and compensate for known instrument originating artifacts such as "jitter" and other artifacts such as "clutter".

The receivers 8, 9 are spaced sufficiently from each other so that the magnitude of the difference of the elapsed signal travel times to each is significant with respect to the time measurement resolution. For the 1 GHz surface-coupled assembly 3, 0.80 meters is adequate. With radar time measurement resolutions of 0.05 ns, depths in standard materials of road construction can be calculated to within 10 mm with receiver separations of at least 0.30 m.

Optimally, the distance between the transmitter antenna 7 and the first receiver antenna 8 should approach zero. The maximum distance from the transmitter antenna 7 to the furthest receiver should be about two times the depth of interest.

The use of more than two receivers per transmitter provides overlapping measurements and increases the accuracy of determining the velocity and the depths of the material's sub-surface features.

The vertical distance d from the surface of the roadway structure 6 to the interface 13 of the first and second layers 14, 15 is unknown. The velocity v of radio waves in the material is unknown. Two equations can be written to solve for the two unknowns.

Velocity is equal to a distance divided by the time taken to travel that distance. Having measured the time taken for the radio wave pulse to reach the first receiver as $t_1$, the velocity $v_1$ of the first path 16 may be calculated by:

$$V_1 = \frac{l_1}{t_1} \quad (3)$$

and similarly for each additional $i^{th}$ receiver:

$$v_i = \frac{l_i}{t_i} \quad (4)$$

where $l_1$ and $l_i$ are the lengths of the first and $i^{th}$ paths respectively.

Similarly, knowing the separation distance S of the transmitter antenna 7 and each receiver antenna as $S_1$, $S_i$ to $S_n$, the lengths of the paths $l_i$ are:

$$l_i = 2\sqrt{\left(\frac{1}{2} S_i\right)^2 + d^2} \quad (5)$$

and thus velocity v is:

$$v_i = \frac{2\sqrt{\left(\frac{1}{2} S_i\right)^2 + d^2}}{t_i} \quad (6)$$

Rearranging and solving for d:

$$d = \frac{1}{2}\sqrt{v_i^2 t_i^2 - S_i^2} \quad (7)$$

Knowing that $d = f(l_1, t_1, S_1) = f(v_2, t_2, S_2)$ and arranging and solving for v:

$$v = \sqrt{\frac{S_i^2 - S_1^2}{t_i^2 - t_1^2}} \quad (8)$$

Substituting equation (6) into (5) yields:

$$d = \frac{1}{2}\sqrt{\left(\frac{S_i^2 - S_1^2}{t_i^2 - t_1^2}\right)t_i^2 - S_i^2} \quad (9)$$

Similar relationships can be developed for reflection paths through multiple layers. Considering the two layers 14, 15 with reflections 16, 17 at the interface 13 and reflections 18, 19 at the interface 20 of the second layer 15 and a deeper layer, equation (9) can be rewritten to calculate the overall depth through both layers 14, 15 as:

$$d_t = \frac{1}{2}\sqrt{\left(\frac{S_i^2 - S_1^2}{t_i^2 - t_1^2}\right)t_i^2 - S_i^2} \quad (10)$$

where $d_t$ is the total depth down to the interface 20. The total depth $d_t$ is the sum of the depths $d_1$ and $d_2$ of the first and second layers 14, 15. Already having calculated $d_1$ one may determine $d_2$ by difference.

Also known is that the total signal travel time necessary to travel through the total depth, $t_t$, is equal to the sum of the times necessary to travel through each successive layer.

Therefore, for vertical propagation through the layers, one may write:

$$t_t = \sum_{j=1}^{n} \frac{d_j}{v_j} = \frac{d_t}{V_a} \quad (11)$$

(1 refer to the $j$th layer and Va is the weighted average velocity through all the layers.)

Rearranging to solve for the velocity $v_2$ in the second layer, one writes:

$$V_2 = d_2\left(\frac{v_a v_1}{v_1 d_t - v_a d_1}\right) \quad (12)$$

and the general case being:

$$V_n = d_n\left(\frac{v_a v_{n-1}}{v_{n-1} d_t - v_a d_{n-1}}\right) \quad (13)$$

The general case calculates the velocity $v_n$ through the lowest layer, having previously determined the weighted average velocity, $v_{n-1}$, and overall depth, $d_{n-1}$, of the previous (n−1) layers using equations (8) through (12).

Corrections can also be made to account for refraction of the radio waves at each boundary using Snell's Law and an iterative solution process.

A second approach to determining the velocity of the radio waves through strictly the first layer 8 is provided. One can compare the timing between receipt of the radio wave pulse 12 at each receiver antenna 8, 9 as it propagates through the air above the surface 6 and as it propagates through the material structure 2. An air-wave 20 travels directly from the transmitter antenna 7, through the air at 3×10⁸ m/s, and is detected at a receiver antenna 8 or 9 at time $t_a$. A ground-wave 21 progresses at a slower velocity $v_g$ dependent upon the material's dielectric constant, arriving at the same receiver antenna 8 or 9 at time $t_g$. The velocity of the radio wave can be calculated using the following ratio:

$$V_g = 3 \times 10^8 \left(\frac{t_a}{t_g}\right) \quad (14)$$

The lower frequency surface-coupled system 3 has poor resolution at depths of less than 100 mm, particularly of interest for the first pavement layer of road surfaces and bridge decks (typically less than 100 mm). In this situation it is preferable to utilize the higher frequency air-launched assembly 4. It is useful to note that an air-launched assembly 4 is unable to create suitably differentiated signal travel times for the two reflected wave paths similar to 16, 17 from which velocities could be calculated, due to refraction at the air-road interface. The intermediate air layer 23, through which the radio wave travels to and from the surface 6, has too high a velocity to provide sufficient differentiating resolution between each of the multiple receivers.

Therefore, the air-launched system is unable to provide useful measures of velocity but it does, however, provide good depth resolution at the 50 to 100 mm depths if the velocity is known. The surface-coupled system 3 can provide the velocity in the first layer 14 using the air and ground wave 20, 21 determination as summarized in equation (14).

Therefore, in a preferred embodiment of the invention, an air-launched system is provided to cooperate with the surface-coupled system for providing more accurate measures of the first, shallow surface layer 14.

Two examples are provided to demonstrate the method of the invention.

EXAMPLE I

Figure 3:
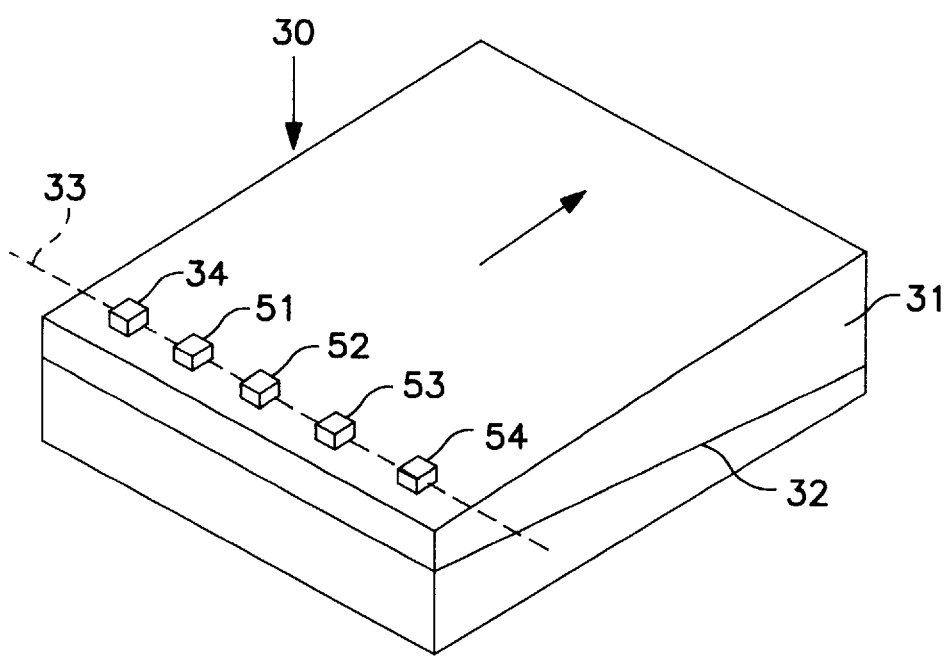
FIG. 3 is a perspective side view of a test bed of wet sand upon which the data of Example I was obtained.

Referring to FIG. 3, a 1.4 meter long test box 30 of moist sand 31 of variable depth (about 0.05 to 0.25 meters) and variable moisture content was prepared. The moist sand overlaid a second sand layer of different moisture content, forming a reflection interface 32. The moisture content changes the dielectric constant of the material and thus its velocity. An array 33 of a 1.5 GHz transmitter 34 and four receiver antennas S1, S2, S3 and S4 were used. The receiver antennas S1 to $S_4$ were spaced in a line across the width of the box, along one lateral side of the transmitter antenna 33 and separated therefrom at spacings of 0.076, 0.156, 0.233, and 0.314 meters. During the sounding, the array 33 was moved along the box along a line perpendicular to the array alignment. The array was moved in 0.025 meter steps, starting at 0.075 and ending at 1.300 meters. The radar range window was 27 ns long with a sampling interval of 0.065 ns.

Figure 4:
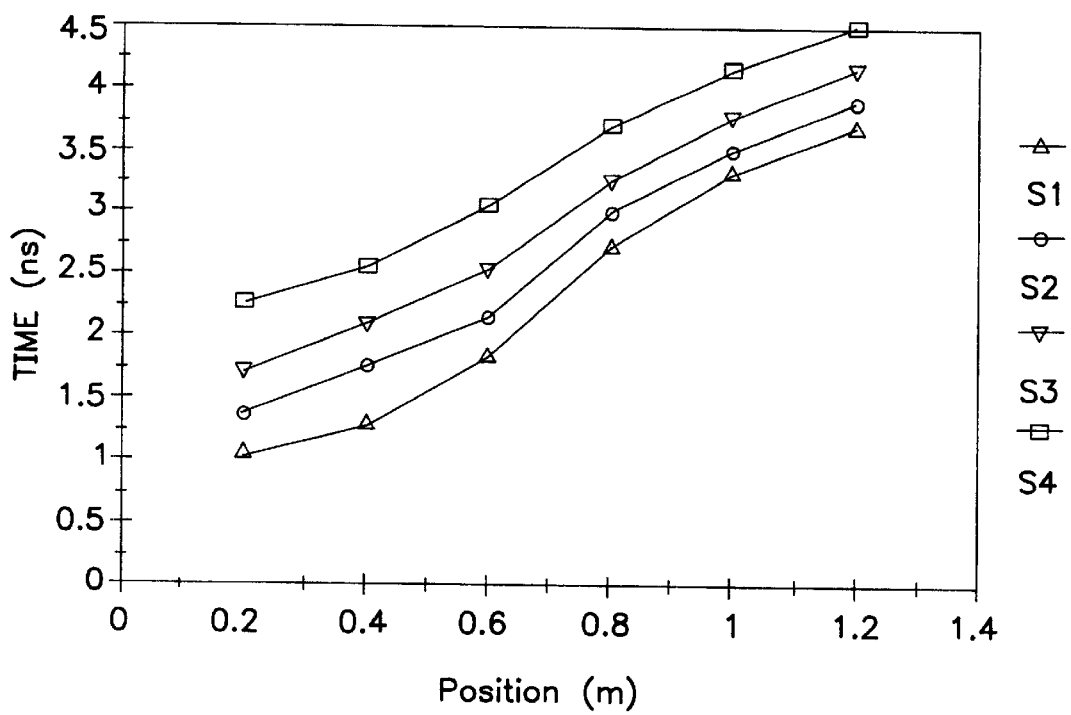
FIG. 4 is a plot of the reflected signal travel times for each of the four receivers, as obtained in connection with the test bed of FIG. 3.

FIG. 4 shows the reflected wave signal times for each of the four receivers. Using equations (8) and (9), velocities and depths were calculated from the measured data.

Figure 5:
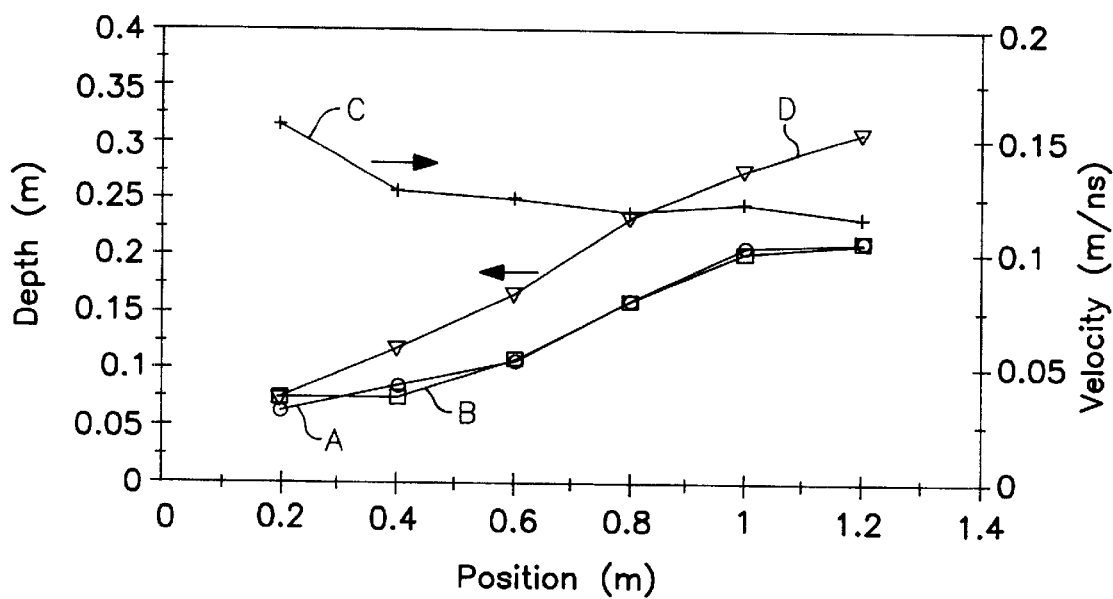
FIG. 5 is a plot of the measured versus the actual depths in connection with the test bed of Example I. Additionally, the measured velocities are presented and also depths are shown, assuming that velocity does not vary as shown and remains constant.

Referring to FIG. 5, line A shows the actual measured depth of the sand. Line B shows the calculated depths as a close match to line A in spite of the declining velocity along the length of the test bed, shown as line C, which is indicative of the changing dielectric constant.

Line D presents a curve of a hypothetical calculated depth, if the velocity of the test bed had been assumed as constant, using the velocity as measured at 0.2 meters. Line D shows how poor the depth calculation would be without the advantage of continuous velocity determination.

EXAMPLE II

Figure 6:
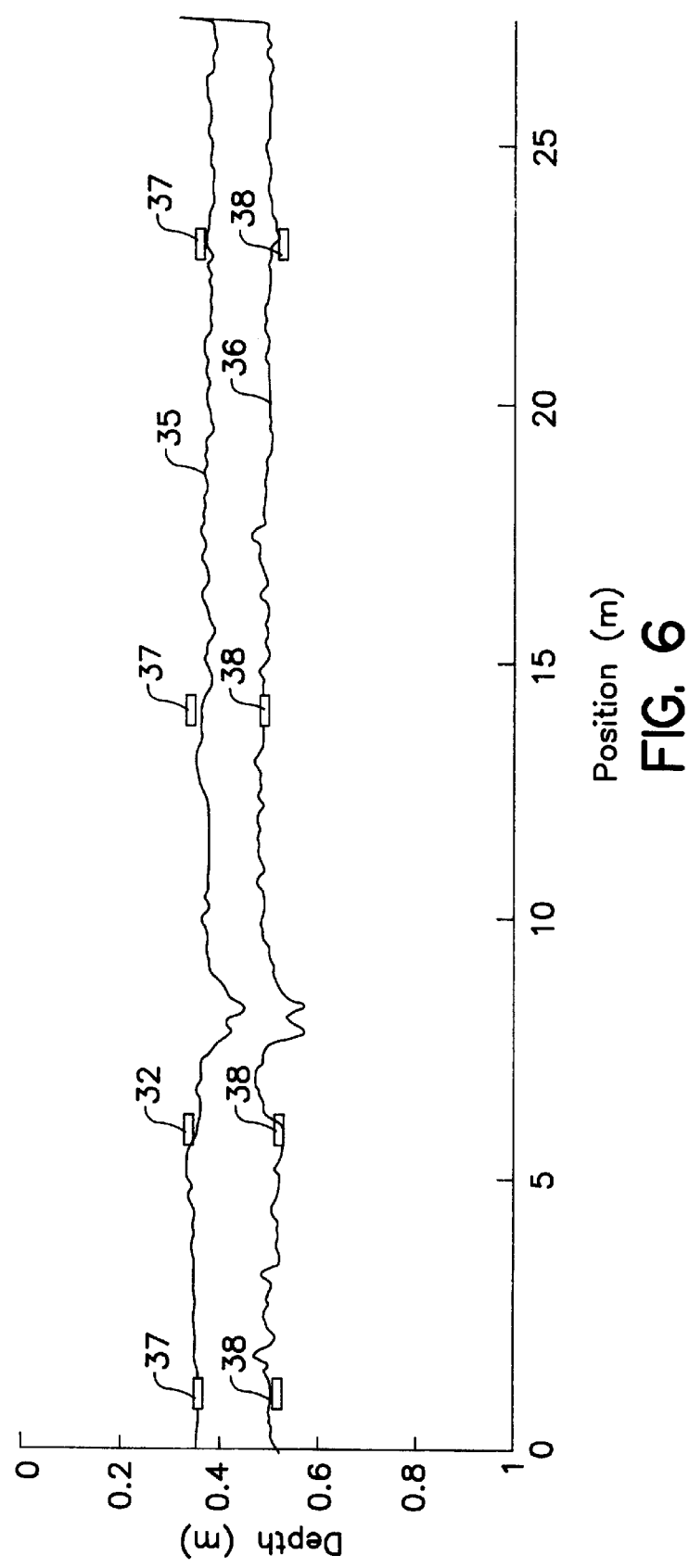
FIG. 6 is a plot of the calculated and core-measured depths of two layers for the actual roadway structure test of Example II.
Figure 7:
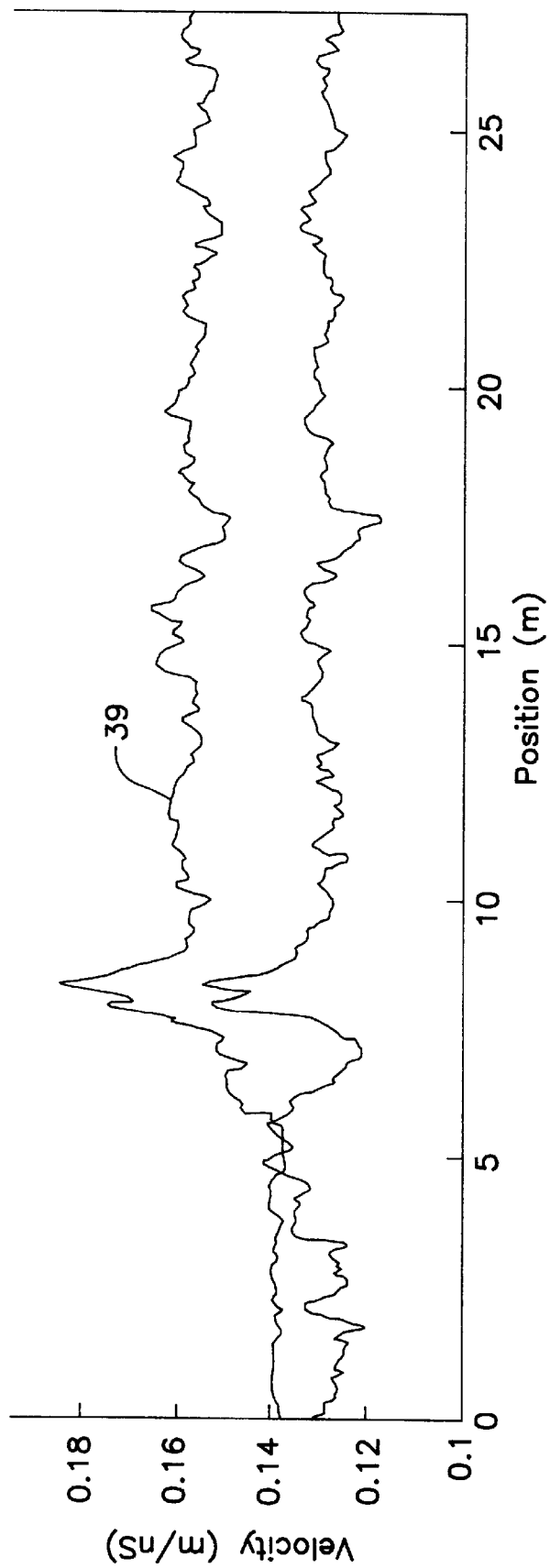
FIG. 7 is a graph of the calculated velocities of the two layers for the test of Example II.

In this example, and referring to FIGS. 6 and 7, an actual road surface was investigated. Both the air-launched and surface-coupled systems were utilized to sound about 25 lineal meters of road surface. The surface-coupled receiver antenna arrangement as shown in FIG. 1 was used. The road was sounded at vehicle speeds of about 3 km/hr. The substantially continuous calculated depths of a first and second layer 35, 36 are compared with four corresponding core data 37, 38 to demonstrate the match between the calculated and actual depths. Good correspondence was achieved. The velocity 39 in the first layer, as seen in FIG. 7, changed significantly about (12%) at about 8 meters position. Using the velocity insensitive method of the prior art, the calculated initial depth of 0.35 m would have been incorrectly calculated as 0.4 m. Using the method of the invention, the step change in the velocity was detected and incorporated in the calculation of the correct depth.

The embodiments of the invention in which an exclusive property or privilege is claimed are defined as follows:

1. A mobile ground penetrating radar system for determining measures of the depth and thickness of pavement structure layers having top and bottom interfaces, comprising:

a transmitter having a surface-coupled antenna for repeatedly radiating impulse radar signals and at least two receivers having surface-coupled antennas, spaced at different distances from the transmitter antenna, for detecting the signals emitted from the transmitter antenna and reflected by each interface;

means for transporting said antenna and said antennas over the layers;

means for determining measures of the signal travel times elapsed from the time each impulse is emitted to the time it is detected at each receiver antenna;

means for utilizing the signal travel time measures and receiver antenna spacings from the transmitter antenna and calculating a measure of signal velocity through a layer; and means for utilizing the signal velocity measure and travel time measures and calculating measures of the layer depth and thickness.

2. The system as set forth in claim 1 comprising:

an assembly comprising a transmitter and receiver, each having an air launched antenna carried by the transporting means, for repeatedly radiating impulse radar signals and detecting the signals emitted and reflected by each interface;

means for determining a measure of the signal travel times elapsed from the time each air-launched impulse is emitted to the time it is detected at the receiver antenna;

means for utilizing the travel time measures and the calculated measure of the signal velocity to calculate measures of the layer depth and thickness.

3. A method for substantially continually and simultaneously determining measures of radio signal velocity and interface depth in at least one subterranean layer forming part of a roadway structure, comprising:

(a) transporting along the roadway structure a ground penetrating radar system comprising a transmitter having a surface-coupled antenna and at least two receivers having surface-coupled antennas spaced at known different distances from the transmitter antenna;

(b) radiating impulse radar signals through the transmitter antenna into the layers and measuring the signal travel times elapsed when the signals are detected at the receiver antennas;

(c) utilizing the signal travel time measures and the receiver antenna spacings from the transmitter antenna and calculating measures of the signal wave velocity through each layer;

(d) utilizing the signal velocity measures and travel time measures and calculating measures of the depth and thickness of each layer.

4. The method as set forth in claim 3 wherein the ground penetrating radar system further comprises air-launched transmitter and receiver antennas; and radiating impulse radar signals through the air-launched transmitter antenna into the layers and measuring the signal travel times elapsed when the signals are received at the air-launched receiver antenna.

\* \* \* \* \*